United States Patent [19]

House et al.

[11] Patent Number: 4,843,048

[45] Date of Patent: Jun. 27, 1989

[54] ORGANOPHILIC CLAY COMPOSITIONS

[75] Inventors: Roy F. House, Houston, Tex.; Victor M. Granquist; Jack C. Cowan, both of Lafayette, La.

[73] Assignee: Venture Innovations, Inc., Lafayette, La.

[21] Appl. No.: 124,171

[22] Filed: Nov. 23, 1987

Related U.S. Application Data

[63] Continuation-in-part of Ser. No. 887,360, Jul. 21, 1986, Pat. No. 4,737,295.

[51] Int. Cl.$^4$ .............................................. C09K 7/06
[52] U.S. Cl. ..................................... 501/148; 106/487; 106/504; 252/8.515
[58] Field of Search .................... 501/148; 106/288 B, 106/308 F, 308 Q; 252/8.515, 8.511

[56] References Cited

U.S. PATENT DOCUMENTS

| | | | |
|---|---|---|---|
| 2,793,996 | 5/1957 | Lummus | 252/8.515 |
| 2,885,358 | 5/1959 | Reddie | 252/8.515 |
| 2,986,516 | 5/1961 | Reddie | 252/8.515 |
| 3,006,845 | 10/1961 | Van Dyke | 252/8.515 |
| 3,057,797 | 10/1962 | Anderson et al. | 252/8.515 |
| 4,105,578 | 8/1978 | Finlayson et al. | 252/316 |
| 4,287,086 | 9/1981 | Finlayson et al. | 252/316 |
| 4,450,095 | 5/1984 | Finlayson et al. | 252/8.515 |
| 4,623,398 | 11/1986 | Goodman | 106/308 N |
| 4,631,091 | 12/1986 | Goodman | 106/308 N |
| 4,713,183 | 12/1987 | Patel et al. | 252/8.55 |

Primary Examiner—William R. Dixon, Jr.
Assistant Examiner—Ann M. Knab
Attorney, Agent, or Firm—Roy F. House

[57] ABSTRACT

Organophilic clays which are effective fluid loss control additives for oil base well-working fluids are prepared from a swelling smectite clay and one or more phosphatides. Preferred phosphatides are phosphoglycerides obtained from vegetable oils, most preferably commercial lecithin such as soybean lecithin. The organophilic clays may also contain quaternary ammonium compounds.

7 Claims, No Drawings

ORGANOPHILIC CLAY COMPOSITIONS

This patent application is a continuation-in-part of copending prior application Ser. No. 06/887,360 filed July 21, 1986, now U.S. Pat. No. 4,737,295.

FIELD OF THE INVENTION

The invention relates to organophilic derivatives of swelling smectite clays, to methods for their manufacture, and to their use in various organic liquids such as oil-base well working fluids.

BACKGROUND OF THE INVENTION

In the drilling of wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like to prepare it for recirculation into the drill pipe. The circulation is substantially continuous while the drill pipe is rotated.

The present invention pertains to oil-base drilling fluids or oil-base muds which includes water-in-oil (invert) emulsions as well as oil-base fluids containing only small amounts or no emulsified water.

An important feature of well working fluids of the class described is their ability to resist filtration. In most instances, when they are in actual use, whether as drilling fluids, packer fluids, fracturing or completion fluids, the well working fluids is in contact with a more or less permeable formation, such as, for example, sandstone, sandy shale and the like, with an effctive balance of pressure such that the fuid tends to be forced into the permeable formation. When a well working fluid is deficient in its ability to resist filtration, then the solids in the fluid are held back by the permeable formation and build up as a filter cake or sludge on its surfaces, while the liquid per se of the well working fluid filters into the permeable formation. The filter cake or sludge thus formed is generally very undesirable. Moreover, the loss of oil to the formation is very expensive, not only because of the cost of the oil itself, but also due to the cost of maintaining the properties and composition of the fluid.

Various additives have been used or suggested for use as fluid loss additives to prevent or decrease this loss of fluid by filtration from oil-base muds. Some of the materials used or proposed for use for this purpose are asphalt and various modified alphaltic materials, various organic modified humic acid or lignite derivatives, and various polymers.

PRIOR ART

Certin colloidal clays, particularly bentonites, swell in water to many times their dry volume, forming thereby colloidal dispersions or gels depending on the concentration of the clay. Various clays including bentonite and similar cation-exchanging silicate minerals have been converted from the hydrophilic to the organophilic form by reaction with many varied organic compounds. Thus replacement of the exchangeable cation of the clay with an organic onium compound has been described in many patents and the literature. Representative onium compounds include substituted ammonium, phosphonium, arsonium, stibonium, oxonium, sulfonium, selenonium, and stannonium compounds. However only certain organic ammonium salts have been utilized on a commercial scale. It has also been disclosed in various patents and publications to react a smectite-type swelling clay with an excess of an organic cationic compound over the amount required to replace the exchangeable cations of the clay, and to react the excess organic cation compound with an organic anion. See for example U.S. Pat. Nos. 2,859,234; 4,412,018; 4,434,075.

U.S. Pat. No. 2,797,196 discloses the modification of various clays with non-anionic surface active agents. U.S. Pat. No. 2,885,360 discloses the process of increasing the viscosity of an organic liquid by mixing therewith a clay having certain characteristics and an organic dispersing agent. The dispersing agent is broadly disclosed as being either water-soluble or insoluble and of any type, that is cationic, anionic, or non-ionic. Included in a multitude of listed compounds as a non-ionic dispersing agent are the polyoxyalkylene oxide derivatives of natural phosphatides such as lecithin. It is disclosed that swelling-type clays such as the swelling bentonites are inoperative in practicing the invention.

Organoclays have been proposed for use in many varied organic liquids to impart many different characteristics or functional properties thereto. Most of the uses proposed rely on the gelling, viscosifying (thickening), or suspension characteristics of the organoclays in organic liquids.

SUMMARY OF THE INVENTION

We have now found that organophilic derivatives of swelling smectite clays can be prepared by reaction of the clay with a phosphatide, preferably commercial lecithin. These phosphatide/clay adducts are organophilic, relatively inexpensive to prepare, and are excellent low-cost fluid loss additives for oil-based well working fluids.

PREFERRED EMBODIMENTS OF THE INVENTION

The novel fluid loss control additives (hereinafter sometimes referred to as FLCA) of this invention comprises organophilic materials which are phosphatide derivatives of a swelling smectite clay.

The phosphatide which is useful in the practice of the invention is one or more phosphatides having the empirical formula $$R_1-CO-O-CH_2-CH(R_2)-CH_2-O-Q \quad \text{(I)}$$ 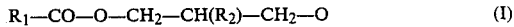

where $R_1$ is an aliphatic group containing from 8 to 29 carbon atoms; $R_2$ is selected from the group consisting of H, OH, $R_1COO$, and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$ and $CH_2-CH(Y)-N(R_3)(R_4)(R_5)_y(A^{b-})_v$; Y is selected from the group consisting of H and $COO(wM^{a\alpha})$; $R_3$, $R_4$, and $R_5$ are independently selected from the group consisting of H, aliphatic groups containing from 1 to 30 carbon atoms, and $R_6CO$; $R_6$ is an aliphatic group containing from 1 to 29 carbon atoms; M is a cation selected from the group consisting of H, an alkali metal, an alkaline earth metal, ammonium, and mixtures thereof; A is an anion of valence by; y=0 or 1; w, x, and z=0 or 1/a where a is the valence of M; v=0 or 1/b; and where Q is $R_1COO$ only when $R_2$ is $OP(O)(O^-zM^{a+})OZ$.

Preferably $R_1$ contains from about 15 to about 17 carbon atoms; $R_2$ is selected from the group consisting of $R_1COO$ and $OP(O)(O^-zM^{a+})OZ$; and $R_3$, $R_4$, and $R_5$ are independently selected from the group consisting of H, $CH_3$, and $R_1CO$.

Such phosphatides are present in amounts up to about 5% by weight in certain crude vegetable oils, which are principally triglycerides of formula (I) wherein both $R_2$ and Q are $R_1COO$ where $R_1$ is an aliphatic group containing from about 15 to about 17 carbon atoms. Various refining procedures, well known in the art, may be utilized to isolate the various individual phosphatides or to concentrate the phosphatides as a group (mixture of phosphatides). Thus crude commercial lecithin from soybean oil contains from about 30% to about 50% by weight triglyceride and from about 50% to about 70% by weight of a mixture of phosphatides, principally phosphatidyl choline (α-form and β-form), phosphatidyl ethanolamine (α-form and β-form), N-Acyl phosphatidyl ethanolamine α-form and β-form), phosphatidyl serine (α-form and β-form), phosphatidyl inositol (α-form and β-form), phosphatidic acid, minor amounts of various other phosphatides, or the alkali metal or alkaline earth metal salts thereof. In the α-form the phosphate ester group $OP(O)(O^-zM^{a+})OZ$ is on the end carbon (Q) whereas in the β-form the phosphate ester group is on the middle carbon atom ($R_2$ group).

Thus preferably the organophilic phosphatide is a mixture of phosphatides having the empirical formula $$R_1COO\text{—}CH_2\text{—}CH(R_2)\text{—}CH_2\text{—}Q \qquad (II)$$

where $R_1$ is an aliphatic group containing from about 15 to about 17 carbon atoms; $R_2 = cR_1COO + dOP(O)(O^-zM^{a+})OZ$; $Q = d\ R_1COO + cOP(O)(O^-zM^{a+})OZ$; Z is selected from the group consisting of $xM^{a+}$, $C_6H_6(OH)_5$ and 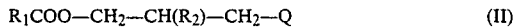; Y is selected from the group consisting of H and $COO(wM^{a+})$; $R_3$, $R_4$, and $R_5$ are independently selected from the group consisting of H, $CH_3$, and $R_1CO$; M is a cation selected from the group consisting of H, an alkali metal, an alkaline earth metal, ammonium, and mixtures thereof; y=0 or 1; A is an anion of valence b; w, x, and z=0 or 1/a where a is the valence of M; v=0 or 1/b; c≧0; d≧0; and c+d=1.

Such phosphatides wherein: $Z = CH_2CH_2N(CH_3)_3$ are called phosphatidyl choline (or lecithin); $Z = CH_2CH_2NH_3$ or $CH_2CH_2NH_2$ are called phosphatidyl ethanolamine (or cephalin); $Z = CH_2CH(COO^-)NH_3$ or $CH_2CH(COOH)NH_2$ are called phosphatidyl serine; $Z = CH_2CH_2NH\text{—}CO\text{—}R_1$ are called N-Acylphosphatidyl ethanolamine; $Z = C_6H_6(OH)_5$ are called phosphatidyl inositol; an Z=H are called phosphatidic acid. The amounts of these phosphatides which are present in the phosphatide mixture of various vegetable oils have been variously disclosed to be as follows:

| Phosphatide | % Phosphatide, Based on the Weight of all Phosphatides, in | | | |
|---|---|---|---|---|
| | Soybean Oil | Corn Oil | Cottonseed Oil | Sunflower Oil |
| Choline | 28–32 | 41–46 | 0–33 | 52 |
| ethanolamine | 12–31 | 4–5 | 19–39 | 20 |
| inositol | 20–32 | 19–23 | 6–37 | 26 |
| serine | — | 0–3 | 0–33 | — |
| acid | — | 14–16 | — | 2 |
| other | 15–18 | 12–16 | 8–25 | — |

Thus a preferred phosphatide mixture suitable for use in this invention contains from about 0% to about 52% phosphatidyl choline, from about 4% to about 39% phosphatidyl ethanolamine, from about 6% to about 37% phosphatidyl inositol, from about 0% to about 33% phosphatidyl serine, from about 0% to about 16% phosphatidic acid, and from about 0% to about 25% of various other phosphatides. The most preferred phosphatide mixture is commercial soybean lecithin.

The organophilic modifier useful in this invention preferably contains from about 50% to about 100% by weight of organophilic phosphatides and from about 0% to about 50% by weight of a vegetable oil triglyceride. Most preferably the organophilic modifier is commercial lecithin which contains from about 30% to about 50% of the vegetable oil from which the lecithin is concentrated, from about 35% to about 70% of a mixture of phosphatides having the empirical formula $$R_1\text{—}CO\text{—}O\text{—}CH_2\text{—}CH(R_2)\text{—}CH_2\text{—}Q \qquad (III)$$

where: $R_1$ is an aliphatic group containing from about 15 to about 17 carbon atoms; $R_2$ is selected from the group consisting of $R_1COO$ and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$, and 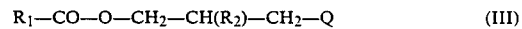; Y is selected from the group consisting of H and $COOH(wM^a)$; $R_3$, $R_4$ and $R_5$ are independently selected from the group consisting of H, $CH_3$, and $R_1CO$; M is a cation selected from the group consisting of H, an alkali metal, an alkaline earth metal, ammonium, and mixtures thereof; A is an anion of valence b; y=0 or 1; w, x and z=0 or 1/a where a is the valence of M; v=0 or 1/b; and Q is $R_1COO$ only when $R_2$ is $OP(O)(O^-zM^{a+})OZ$; and from 0% to about 18% of other phosphatides.

While the ammonium-containing phosphatides may be in the internally neutralized zwitterionic form (i.e., v=0, y=1, and either w=0 or z=0), it is believed that such phosphatides react with the clay by substitution because of the insolubility of the resulting organophilic clay adduct. Also, since inorganic phosphates have been demonstrated to complex with clays, a similar complex may be formed between the clay and the phosphatides. In any case, regardless of the mechanism of the formation of the organophilic clay composition, there is formed a phosphatide-clay adduct which is an effective fluid loss additive for oil-base well working fluids.

The clays used to prepare the organophilic clay compositions of this invention are smectite-type clays which have a cation exchange capacity of at least 50 milliequivalents per 100 grams of clay which have sufficient of the exchangeable cations being selected from the group consisting of sodium, lithium, and mixtures thereof, such that the clay exhibits osomotic swelling in deionized water.

The structure of the minerals of the smectite group of clay minerals comprises a 3-layer sheet structure wherein a central octahedral layer of principally alumina or magnesia is sandwiched between two tetrahydral layers of principally silica. In the tetrahedral layer, tetravalent Si is sometimes partly replaced by trivalent Al or Fe. In the octahedral sheet, there may be replacement of trivalent Al by divalent Mg, or of divalent Mg by monovalent lithium atoms. In the smectite clay minerals where an atom of lower positive valence replaces one of higher valence, there results within the clay structure deficit of positive charge, or, in other words, an excess of negative charge. This excess of negative charge is compensated by the adsorption on the layer surfaces of cations which are too large to be accommodated within the interior of the crystal structure.

In the presence of water, the compensating cations on the layer surfaces may be exchanged by other cations when available in solution; hence they are called "exchangeable cations." The total amount of these cations can be determined analytically. This amount, expressed in milliequivalents per 100 gram of dry clay, is called the "cation exchange capacity" (CEC) or the "base exchange capacity" (BEC) of the clay.

In the stack of layers which form a smectite particle, the exchangeable cations are located on each side of each layer in the stack; hence they are present not only on the exterior surfaces of the particle but also in between the layers. When smectite clays are contacted with water or with water vapor, the water molecular penetrate between the layers. This so-called "interlayer swelling" leads to at most a doubling of the dry clay volume when four layers of water are adsorbed. However, for the swelling smectite-type clays useful in this invention, the swelling process continues, and an amount of water is imbibed which is many times the volume of the original clay. The additional swelling is a result of the double-layer repulsive forces between the surfaces of the individual particles, which pushes them apart. This swelling is called "osmotic swelling" since the water tends to equalize the high concentration of ions between any two particles and the low concentration of ions far away from the particle surfaces in the bulk aqueous solution. As a result of this osmotic swelling, the clay/water system becomes a gel or colloidal solution depending on the concentration of the clay.

The organophilic clays of this invention preferably contain between about 0.15 and about 1.0 parts by weight of phosphatide per part of clay, i.e., the phosphatide/clay ratio is preferably from about 0.15 to about 1.0, most preferably from about 0.2 to about 0.75. When commercial lecithin containing from about 50%–70% by weight phosphatides is used, the weight ratio of lecithin/clay is thus preferably from about 0.3 to about 1.5, most preferably from about 0.4 to about 1.0.

The organophilic clays can be prepared by any process in which the individual clay particles are contacted with the phosphatide, preferably at an acidic pH. It is preferred that the pH of the clay/phosphatide mixture be less than about 4. Most preferably an amount of acid is added which is at least theoretically equivalent to neutralize any base added to the clay/phosphatide mixture. Thus the clay may be dispersed in water to allow the clay particles to swell and disperse followed by reaction with the phosphatide. Preferably the non-clay impurities are removed from the clay suspension/dispersion as by settling and decantation, centrifuging, and like processes known in the art. The clay may be ion-exchanged to convert the exchangeable cations to the homoionic alkali metal form, preferably sodium, before reaction of the clay dispersion with the phosphatide.

The phosphatide may be added to the swelling smectite clay in any convenient manner such that the individual clay particles are contacted by the phosphatide. Thus a colloidal aqueous dispersion/solution of the phosphatide can be prepared by admixing the phosphatide with water at a basic pH, preferably at a pH greater than about 10, and adding this to the clay slurry. Alternatively, the phosphatide can be solubilized in an appropriate organic solvent which is miscible or soluble in water, and the phosphatide-containing solution added to the clay slurry.

It is preferred that the organophilic clay adducts of this invention be prepared at an acidic pH, preferably at a pH less than about 4. This may be accomplished by adjusting the pH of the clay slurry either before addition of the phosphatide or after addition of the phosphatide. It is most preferably preferred that the amount of acid used for pH adjustment be at least sufficient to theoretically react with and neutralize any base added to the aqueous clay/phosphatide mixture. Representative acids which may be used include hydrochloric acid, sulfuric acid, acetic acid, phosphoric acid, or any other acid having a $pk_a \leq 4.75$ at 25° C.

After reaction of the phosphatide and clay, the organophilic clay is recovered by removing the water therefrom. This may be accomplished by spray drying the aqueous suspension, or by filtration of the aqueous suspension followed by drying of the filter cake and grinding. Alternatively, the organohilic clay-phosphatide adduct may be separated by a "flushing" type process in which an organic liquid is added to the aqueous clay phosphatide suspension and thereafter the water removed therefrom such as by drying, decantation and drying, etc.

In a preferred flushing process where an oleaginous liquid is added to an aqueous clay-commercial soybean lecithin aqueous suspension to form an emulsion from which the water is removed by drying, it has been unexpectedly found that semi-solid agglomerates are formed when the emulsion is undisturbed during the drying period provided that the commercial soybean lecithin/clay ratio is from about 0.3 to about 0.75 and the concentration of organophilic clay (clay plus lecithin) in the clay-lecithin-oleaginous liquid dried product is from about 10% to about 35% by weight. Subjecting these semi-solid agglomerates to high shear produces viscous liquids the viscosity of which increases as the concentration of the organoclay increases. If the emulsions are agitated while the water is removed therefrom these semi-solid compositions do not form, rather a viscous liquid or grease-type gel is formed depending on the concentration of the organophilic clay.

Other processes can be used to prepare the organohilic clay. Thus the clay, phosphatide, and acid can be intensively mixed or sheared together in the presence of sufficient water to allow the phosphatide and acid penetrate between the individual clay platelets to the extent necessary to render the platelets organophilic. Suitable intensive mixers which are capable of handling semi-solid materials are pug mills, extruders, ribbon blenders, Loedige/Littleford-type mixers, Martin mixer, and the like apparatus.

The organophilic clays of this invention are useful as additives to organic liquids to decrease the loss of liquid therefrom to porous substrates contacted by the organic liquids, such as printing inks, coatings, oil-base well working fluids, and the like. Generally the organic liquid will contain from about 1.5% to about 30% of the organophilic clay, based on the weight of the organic liquid.

The organophilic smectite clay-phosphatide adducts are extremely useful as fluid loss control additives (hereinafter sometimes referred to as "FLCA") in invert (water-in-oil) emulsion drilling fluids. They may be used as produced, but preferably after drying and grinding as disclosed hereinbefore. The FLCA are dispersed in oil base well-working fluids with the normal agitation available where such fluids are prepared, such as at liquid "mud" plants or at the location where the drilling fluid will be used.

The oil which forms a continuous phase of the well-working fluid is a petroleum (mineral) oil, and most generally is an ordinary diesel oil, although it may be rather lighter, such as kerosene, or somewhat heavier, such as fuel oil, white oils, or crude oil, as is well known in the art. In some cases the sole constituents of the drilling fluids may be simply a petroleum oil and the FLCA. The latter may be present from as little as 5 kg/m$^3$ to as high as 150 kg/m$^3$. The beneficial effect on fluid loss of the use of the FLCA may be observed even at the lowest concentration. This is especially the case when the FLCA is added to the drilling fluids containing other additives, of types to be mentioned hereinafter.

Frequently, the well-drilling fluids will contain other additives, a common one being water, often present from as little as 2% or 3% by volume to as great as 40% to 60% by volume. It is desirable and common to use a suitable emulsifying agent, which may be the calcium salt of an inexpensive fatty acid, e.g., calcium tallate, to emulsify the water in the oil. It is important that water be kept in the form of a good stable water-in-oil emulsion.

The presence of water in the drilling fluid serves to increase the density of the fluid somewhat since the water is heavier than the oil used; and it also helps to reduce filtration. Also it lowers the cost of the drilling fluid which is often an important item when large volumes are used. Often water soluble salts such as calcium chloride are added to the aqueous phase.

Weighting materials are routinely used in drilling where needed, such as ground barite, calcium carbonate, siderite, iron oxide, ilmenite and the like. Suspending agents and viscosifiers such as organophilic clays, asphalt, polymers and the like are commonly employed. Moreover, the drilling fluid may contain various oil soluble or dispersible materials which function to keep the solids in the drilling fluid from being wet with water.

Addition of one or more amino compounds to the well-working fluid may advantageously increase the thermal stability and emulsion stability of the well-working fluid.

The organophilic smectite clay-phosphatide adducts are also useful as emulsion stabilizers for water-in-oil emulsions, as viscosifying or suspending additives in organic liquids, as anti-misting additives in organic liquid-base printing inks, as foundry sand binders, and in general should be investigated for use wherever prior art organophilic clays have been found useful.

The following non-limiting examples illustrate the results and benefits obtainable utilizing the organophilic clay FLCA of this invention in drilling fluids as well as illustrating the preferred method of preparing the organophilic clays. In the examples, all percentages are by weight unless otherwise indicated. All data were obtained utilizing the American Petroleum Institute's recommended testing procedures as set forth in API RP 13B.

EXAMPLE 1

100 parts of Wyoming bentonite were mixed with 900 parts of hot water (65° C.) with a high shear mixer. To this slurry were added 12 parts of glacial acetic acid followed by a mixture comprising 33.3 parts of commercial soybean lecithin and 120 parts isopropyl alcohol. After 10 minutes mixing, 700 parts of a refined petroleum oil were added and emulsified at the high shear. The emulsion formed was placed in an oven at 80°–93° C. to drive off the water.

A semi-solid composition comprising the bentonite clay, lecithin, and oil was obtained. The composition was converted by high shear mixing into a viscous liquid.

EXAMPLE 2

Example 1 was repeated except there were used 42.85 parts of commercial soybean lecithin and 750 parts of the petroleum oil. Identical results were obtained.

EXAMPLE 3

Example 1 was repeated except that there were used 60 parts of commercial soybean lecithin and 840 parts of the petroleum oil. Identical results were obtained.

EXAMPLE 4

Example 1 was repeated except that there were used 100 parts of commercial soybean lecithin and 1050 parts of the petroleum oil. A composition having a heavy grease consistency was obtained. The composition was converted by high shear mixing into a viscous liquid.

EXAMPLE 5

Example 2 was repeated except that there were used 428.5 parts of the refined petroleum oil. A semi-solid composition was obtained which was converted by high shear mixing into a viscous liquid.

EXAMPLE 6

4565 parts of an aqueous Wyoming bentonite clay slurry from which the impurities had been removed and containing 100 parts of clay were heated to 75°–80° C. Thereafter 10 parts of sodium hydroxide were added while mixing followed by 100 parts of commercial soybean lecithin and finally 50 parts of glacial acetic acid. After reaction for 30 minutes the slurry was filtered and the filter cake dried at 62°–65° C. The dried sample was then ground.

The sample was evaluated by mixing 17.5 grams of sample in 350 milliliters of a refined petroleum oil for 15 minutes followed by the addition of 87.5 milliliters of water. After mixing an additional 10 minutes there was obtained a water-in-oil emulsion containing 0.04 g/cc (14 ppb) of the organoclay sample. This emulsion had an API fluid loss of 1.7 cc which was all oil.

EXAMPLE 7

4675 parts of an aqueous Wyoming bentonite slurry from which the impurities had been removed and containing 100 parts of clay were heated to 75°–80° C. Thereafter 50 parts of glacial acetic acid were added while mixing followed by a mixture comprising 100 parts of a commercial soybean lecithin and 300 parts of isopropyl alcohol. After reaction for 30 minutes the slurry was filtered, the filter cake dried at 62°–65° C., and the sample ground. The dried and ground sample, evaluated as in Example 6, produced an emulsion which had an API fluid loss of 2.5 cc which was all oil.

EXAMPLE 8

4975 parts of an aqueous Wyoming bentonite clay slurry from which the impurities were removed and containing 100 parts of the clay were heated to 65°–75° C. The clay was flocculated while stirring with a solution containing 75.9 parts of dimethyldihydrogenated tallow ammonium chloride and 10.4 parts of commerical soybean lecithin in 100 parts of isopropyl alcohol. After reaction for 20 minutes the suspension was filtered, the filter cake dried to about 3% moisture, and ground through a hammermill.

This organophilic clay when evaluated as in Example 6 produced an emulsion which had an API fluid loss of 5.5 cc which was all oil. When 0.3 grams of this organoclay was hand shaken in a graduated cylindr with 10 cc of either a low viscosity mineral oil or toluene, the organic liquid suspension remained homogeneous and exhibited no settling.

The organophilic clay product of Example 8 is an example of an organoclay prepared by reaction of a swelling smectite clay with a phosphatide and with a cationic organic compound of the type used in the prior art for the preparation of organoclays.

Thus another aspect of the invention is the preparation of organophilic clays by reaction of swelling smectite clays with both a phosphatide and a quaternary ammonium compound. Preferred quaternary ammonium compounds can be represented by the formula:

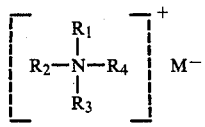

wherein $R_1$ is an alkyl group having 12 to 30 carbon atoms; $R_2$, $R_3$, and $R_4$ are independently selected from the group consisting of hydrogen, alkyl groups containing from 1 to 30 carbon atoms, aryl groups, and aralkyl groups containing from 1 to 30 carbon atoms in the alkyl chain; and wherein M is a charge balancing anion. Preferably M is selected from the group consisting of chloride, bromide, iodide, nitrite, hydroxide, acetate, methyl sulfate, phosphate, and mixtures thereof.

Preferably the phosphatide/clay ratio is in the range from about 0.025 to about 0.2. When commercial lecithin containing from about 50% to about 70% by weight of phosphatide is used, the weight ratio of commercial lecithin/clay is from about 0.05 to about 0.4, preferably from about 0.05 to about 0.25. The concentration of the quaternary ammonium compound is from about 75 milliequivalents per 100 grams of clay to about 125 milliequivalents per 100 grams of clay. Most preferably the concentration of the quaternary ammonium compound will be sufficient to at least satisfy the CEC of the day. Thus, the organophilic clay will most preferably contain a quantity of phosphatide plus quaternary ammonium compound which is in excess of the CEC of the day.

These organophilic clays comprising both a phosphatide and a quaternary ammonium compound are extremely useful as easy dispersing solid suspension additives in the preparation of printing inks, paints, coatings, and other systems in which solids are suspended in an organic liquid carrier.

What is claimed is:

1. The method of preparing an organophilic clay, comprising an adduct of a smectite clay which exhibits osmotic swelling and commercial lecithin, said commercial lecithin comprising from about 30% to about 50% of a vegetable oil, from about 35% to about 70% of one or more phosphatides having the empirical formula $$R_1-CO-O-CH_2-CH(R_2)-CH_2-Q$$

where: $R_1$ is an aliphatic group containing from about 15 to abouto 17 carbon atoms; $R_2$ is selected from the group consisting of $R_1COO$ and $OP(O)(O^-zM^{a+})OZ$; Q is selected from the group consisting of $R_1COO$ and $OP(O)(O^-zM^{a+})OZ$; Z is selected from the group of consisting of $xM^{a+}$, $C_6H_6(OH)_5$, and $CH_2-CH(Y)-N(R_3)(R_4)(R_5)_y(A^{b-})_v$; Y is selected from the group consisting of H and $COO(wM^{a+})$; $R_3$, $R_4$, and $R_5$ are independently selected from the group consisting of H, $CH_3$, and $R_1CO$; M is a cation selection from the group consisting of H, an alkali metal, an alkaline earth metal, ammonium, and mixtures thereof; A is an anion of valence b; y=0 or 1; w, x and z=0 or 1/a where a is the valence of M; v=0 or 1/b; and Q is $R_1COO$ only when $R_2$ is $OP(O)(O^-zM^{a+})OZ$; and from 0% to about 18% of other phosphatides, which comprises mixing the clay with the phosphatide in the presence of water and an acid at a pH less than about 4.0.

2. The method of claim 1 wherein the weight ratio of the commercial lecithin to the clay is from about 0.3 to about 1.5.

3. The method of claim 1 wherein the clay is bentonite.

4. The method of claim 1 wherein the commercial lecithin is soybean lecithin.

5. The method of claim 2 wherein the clay is bentonite.

6. The method of claim 4 wherein the clay is bentonite.

7. The method of claim 2 wherein the clay is bentonite and wherein the commercial lecithin is soybean lecithin.

* * * * *